Sept. 10, 1963   H. WATANABE ETAL   3,103,480
DOUBLE BRIDGE ELECTRODE FOR ELECTROCHEMICAL ANALYSIS
Filed Dec. 10, 1958

INVENTORS.
HIDEO WATANABE
JOHN E. LEONARD

BY THEIR ATTORNEYS.
HARRIS, KIECH, RUSSELL & KERN

United States Patent Office 3,103,480
Patented Sept. 10, 1963

3,103,480
DOUBLE BRIDGE ELECTRODE FOR ELECTRO-
CHEMICAL ANALYSIS
Hideo Watanabe and John E. Leonard, Fullerton, Calif.,
assignors to Beckman Instruments, Inc., a corporation
of California
Filed Dec. 10, 1958, Ser. No. 779,359
6 Claims. (Cl. 204—195)

This invention relates to electrode assemblies for use in making electrochemical measurements. Typically, in such measurements, an indicating electrode and a reference electrode are used. The indicating electrode is inserted into the sample and is responsive to some ionic property thereof, such as the concentration of a particular ion. The reference electrode, also inserted into the medium, acts to complete the electrical circuit and establishes with respect to the sample medium a potential that is substantially independent of sample variations.

The reference electrode usually consists of a half-cell immersed in an electrolyte contained within the body of the electrode. Ionic contact is maintained between the enclosed electrolyte and the sample by means of a very small leak or liquid junction in the wall of the electrode body. The half-cell comprises a body of a particular metal and a sparingly soluble salt of that metal in contact with the metal, together with a suitable electrical connection from the body to an external lead. The electrolyte is usually selected to contain in appreciable concentration anions of the same species as that of the sparingly soluble salt. The most widely used half-cells are of the mercury-mercurous chloride or calomel type and the silver-silver chloride type. The electrolytic medium is ordinarily an aqueous solution of potassium chloride.

In many eelctrochemical measurements, leakage of electrolyte from the reference electrode into the sample solution through the liquid junction is objectionable. For example, in the measurement of either potassium ion or chloride ion in a sample, leakage of potassium chloride into the sample is undesirable. As another example, traces of heavy ions such as mercurous ion derived from a calomel half-cell in the reference electrode, would be objectionable in various biological media, such as media containing enzymes.

The conventional solution for this problem is to isolate the electrolyte of the half-cell from the sample by means of an intermediate salt bridge. A typical salt bridge comprises an inverted U-shaped tube containing an electrolyte that is innocuous toward the sample. One of the lower ends of the bridge tube is inserted into the sample and the other end is inserted into a separate vessel containing a suitable electrolyte. Into this separate vessel is inserted the conventional reference electrode. Liquid junctions at the ends of the U-tube provide ionic contact with the solutions in the sample and separate vessels, thus completing the electrical circuit through the indicating electrode, the sample, the U-tube and the reference electrode. This mode of isolation is inconvenient, requiring additional glass vessels for the ionically coupled fluids and the manipulation of several separate elements of apparatus each time a new sample is measured.

It is an object of the invention to provide an electrochemical electrode assembly which functions as a reference electrode and which can be used with various types of half-cells. A further object is to provide such an electrode assembly having means for isolating the electrolyte of the half-cell from the sample medium. A further object is to provide such an electrode assembly which is built into a single electrode structure so that the reference electrode can be inserted directly into the sample medium.

It is an object of the invention to provide such an electrode assembly having an indicating electrode as an integral part thereof, thus requiring handling and insertion of only a single unit with no auxiliary containers or electrodes necessary while making an electrochemical measurement and obtaining the desired isolation between the half-cell electrolyte and the sample. A further object is to provide such a structure wherein various types of indicating electrodes can be utilized and various types of measurements made. For example, the structure may be adapted for pH measurements, a halide ion measurement, for example, chloride ion, and for measurement of metallic ions, for example, sodium and potassium ion.

It is an object of the invention to provide an electrochemical electrode structure having a tubular body with a lower end adapted for immersion into a sample medium, means defining upper and lower reservoir spaces within the tubular body for containing electrolytes, means for providing ionic communication between the bodies of electrolyte and between the lower electrolyte and the sample medium, and means for electrically coupling the upper electrolyte to an external conductor. A further object is to provide such a structure having access ports in the body for filling the electrolyte reservoir spaces, with the body having means carried thereon for opening and closing the ports. Another object is to provide such a structure having liquid junctions providing the desired ionic communication between fluids, the liquid junctions being threads, capillary tubing, or the like.

It is an object of the invention to provide an electrochemical electrode assembly having a tube with axially disposed fluid chambers therein, an electrolyte in each of the chambers, a liquid junction between the chambers and another liquid junction between the lower chamber and the exterior of the end of the electrode assembly which is inserted into the sample medium, and a conductor terminated in the upper chamber to provide an electrical circuit between the electrolyte therein and the exterior of the electrode assembly.

The invention also comprises novel details of construction and novel combinations and arrangements of parts, which will more fully appear in the course of the following description. The drawing merely shows and the description merely describes preferred embodiments of the invention which are given by way of illustration or example.

Figure 1:
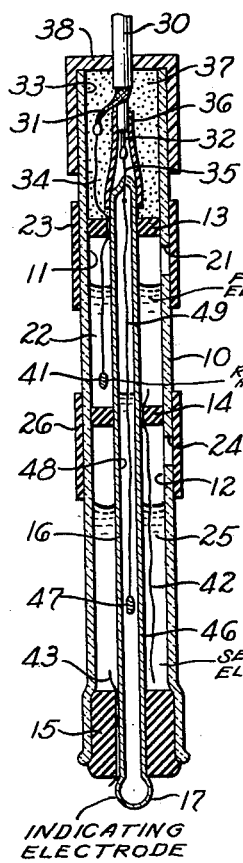
FIG. 1 shows a preferred embodiment of the invention having both a reference electrode and a pH indicating electrode.

The electrode structure of FIG. 1 is housed in a tubular body member 10 which is preferably made of glass. Means are provided within the body member to define two fluid chambers or reservoir spaces 11, 12, the chambers preferably being axially spaced one above the other. In the structure of FIG. 1, apertured discs or separators 13, 14, 15 are positioned within the body member and serve to define the fluid chambers and to support an indicating electrode 16 within the body member 10, with a sensitive end 17 exposed at the lower end of the electrode assembly. The discs are preferably of a resilient or elastomeric material such as rubber or the like and serve as seals for separating the fluid chambers.

An access opening or port 21 in the wall of the body member 10 permits introduction of an electrolyte 22 into the chamber 11. A sleeve 23, preferably formed of an elastomer such as silicone rubber, is slidingly positioned on the body member for closing off the opening 21. A similar access opening 24 provides for introduction of an electrolyte 25 into the chamber 12 and a sleeve 26 permits opening and closing of the access port.

An electrical cable 30, shown here as a coaxial cable having an outer braid conductor 31 and an inner wire conductor 32, is terminated in the upper end 33 of the body member. The braid conductor is connected to a conductor 34 which traverses the resilient disc 13 into the chamber 11, preferably being clamped between an edge of the disc and the wall of the indicating electrode 16 or between the disc and the body 10. The inner conductor 32 is connected to another conductor 35 which is sealed in the upper end of the indicating electrode 16. An insulating sleeve 36 is placed over this latter connection and the upper end 33 is filled with an asphalt or other sealing composition 37 and is closed by a cap 38.

A reference half-cell 41 is connected to the lower end of the conductor 34 and is immersed in the electrolyte 22. A liquid junction between the chambers 11 and 12 provide ionic communication between the electrolytes 22 and 25 and another liquid junction provides ionic communication between the electrolyte 25 and the sample into which the lower end of the structure is inserted. Each liquid junction is in the form of a capillary, for example a thread or a fine bore tube, providing a liquid path between the fluid bodies. A preferred form of liquid junction is shown in FIG. 1 as a thread 42 having its ends in the chambers 11, 12, respectively, and being clamped against the indicating electrode by the resilient disc 14. The thread may, for example, be of linen, asbestos, or glass fiber. A similar thread 43 is clamped in place by the resilient separator 15 with one end of the thread in the chamber 12 and the other end projecting from the electrode assembly adjacent the sensitive end 17 of the indicating electrode.

The particular materials used for the half-cell and the electrolytes of FIG. 1 may be of various kinds depending upon the particular measurement being conducted. The two electrolytes 22 and 25 are ordinarily different, though in some cases they may be the same. As an example, for use in pH measurements of solutions from which potassium and chloride ions must be excluded, the electrolyte 22 of the half-cell may be an aqueous solution of potassium chloride and the electrolyte 25 an aqueous solution of ammonium nitrate. The half-cell 41 may comprise a looped end of the conductor 34, the latter being formed of silver wire, and a small body of fused silver chloride embedded in the loop.

The indicating electrode 16 includes a tubular glass body 46 having a pH sensitive membrane at the closed end 17 and a silver-silver chloride half-cell element 47 immersed in an electrolyte 48 and connected to the conductor 35 by a silver wire 49.

In making an electrochemical measurement, the cable 30 is connected to a suitable amplifier, meter or other recording device and the lower end of the unit is inserted into the sample medium. Only this single electrode assembly is necessary and no auxiliary containers or other equipment are required. The electrolytes 22, 25 are replenished as required through the access ports 21, 24 respectively and the unit is available for continuous operation.

Figure 2:
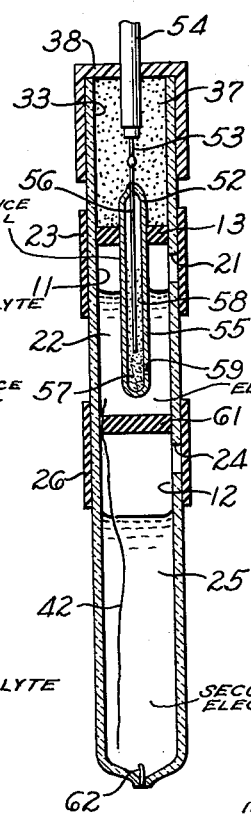
FIG. 2 shows another embodiment of the invention having only a reference electrode.

An alternative form of the invention which does not utilize an indicating electrode is shown in FIG. 2. Elements identical to those of the structure of FIG. 1 are identified by the same reference numerals. A half-cell 52 of the mercury-mercurous chloride type is supported within the chamber 11 by the disc 13, the half-cell being connected to a conductor 53 of a cable 54 in the upper end 33 of the body member. The half-cell comprises a tubular body 55 closed at both ends with an amalgamated platinum wire 56 sealed in the upper end and joined to the conductor 53. A layer of glass wool 57 in the lower end of the body 55 is covered by a mixture 58 of mercury, mercurous chloride and potassium chloride solution. The wire 56 dips into the mixture and a small opening 59 in the lower wall of the body 55 provides a liquid junction between the half-cell and the electrolyte 22.

The thread 42 is held in position by a resilient disc 61 which separates the upper and lower chambers 11, 12, the thread providing the liquid junction between the electrolytes 22, 25. The lower end of the body member is closed with an asbestos thread or fiber 62 sealed therein to provide the liquid junction between the electrolyte 25 and the medium into which the electrode assembly is inserted.

The electrode structure of FIG. 2 may be used in place of the conventional reference electrode and a salt bridge tube, the structure of the invention providing the desired isolation between the half-cell and the sample within a single structure. The particular materials used for the electrolytes and the half-cell will depend upon the particular measurement being carried out. For use as the reference electrode in a pH measurement, wherein leakage of potassium chloride into the sample would be objectionable, the upper electrolyte could be an aqueous potassium chloride solution and the lower electrolyte an aqueous ammonium nitrate solution.

Figure 3:
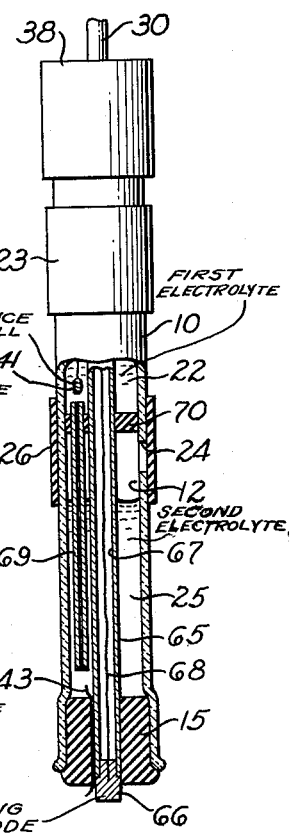
FIG. 3 shows another embodiment of the invention having a reference electrode and an indicating electrode of the metal or metal-salt type.

The electrode structure of FIG. 3 is similar to that of FIG. 1 and utilizes a different type of capillary means for one liquid junction and a different type of indicating electrode. Identical elements are identified by the same reference numerals.

An indicating electrode 65 is positioned within the body member 10 in the same manner as in the structure of FIG. 1. A sensing element 66 is sealed in the lower end of a glass tube 67 and is connected to the inner conductor of the cable 30 by a lead wire 68. The sensitive element 66 may for certain applications comprise a billet of platinum cemented or otherwise sealed to the tube 65, or for other uses may comprise a billet of silver or silver coated with silver chloride or the like. Other materials for the sensing element useful for various measurements are bismuth, lead and antimony.

The capillary which provides the liquid junction between the electrolytes 22, 25 consists of a capillary tube 69 supported in a resilient disc 70 which separates the upper and lower chambers, the capillary tube having a capillary bore therethrough providing the ionic communication between the electrolytes. The capillary tube may be of glass, plastic or other suitable material.

The particular materials used in the half-cell, the electrolytes and the sensing element are dependent upon the particular measurements being undertaken. As an example, in the measurement of chloride ion or silver ion concentration, a silver-silver chloride half-cell 41, an aqueous solution of potassium chloride upper electrolyte 22, an aqueous solution of ammonium nitrate lower electrolyte 25, and a sensing element of silver coated with silver chloride may be selected. The measurement is conducted by inserting the lower end of the electrode structure into the sample medium with the cable being connected to a suitable indicating instrument as in the embodiment of FIG. 1.

Thus it is seen that the electrode assembly of the invention provides a single unit which may be inserted directly into the sample medium for carrying out the desired electrochemical measurement with no auxiliary electrode or salt bridge equipment necessary. Alternatively, the invention may be used to provide an ionically isolated reference electrode for use with various types of indicating electrodes for insertion directly into the sample medium.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In an electrochemical electrode assembly which is adapted for insertion into a sample medium, the combination of: a tube; an indicating electrode having a sensitive end for contact with the sample; a plurality of axially spaced resilient separators fitted within said tube, said separators supporting said indicating electrode within said tube and defining first and second fluid chambers within said tube around said indicating electrode, with said second chamber adjacent said sensitive end; a first electrolyte in said first chamber; a second electrolyte in said second chamber; a first capillary providing a liquid junction between said first and second chambers, said capillary being clamped in place by the resilient separator positioned between said chambers; a second capillary providing a liquid junction between said second chamber and the sample into which said electrode assembly is inserted, said capillary being clamped in place by the resilient separator positioned at the end of said second chamber; a reference half-cell positioned in said first chamber and dipping into said first electrolyte; and an electrical conductor providing an electrical conduction path between said half-cell and the exterior of said electrode assembly.

2. In an electrochemical electrode assembly which is adapted for insertion into a sample medium, the combination of: a tube; an indicating electrode having a sensitive end for contact with the sample; means for supporting said indicating electrode within said tube and defining first and second fluid chambers within said tube around said indicating electrode, with said second chamber adjacent said sensitive end; a first electrolyte in said first chamber; a second electrolyte in said second chamber, with at least one polarity of the ions of said second electrolyte of different composition than the corresponding polarity ions of said first electrolyte; a first capillary providing a liquid junction between said first and second chambers; a second capillary providing a liquid junction between said second chamber and the sample into which said electrode assembly is inserted; a reference half cell positioned in said first chamber and dipping into said first electrolyte; and an electrical conductor providing an electrical conduction path between said half cell and the exterior of said electrode assembly.

3. An electrode assembly as defined in claim 1 in which said indicating electrode is a glass electrode having a pH sensitive membrane at one end for contact with the sample.

4. An electrode assembly as defined in claim 1 in which at least one of said capillaries is a thread.

5. An electrode assembly as defined in claim 1 in which at least one of said capillaries is a capillary tube.

6. An electrode assembly as defined in claim 1 in which said tube has openings into the respective chambers for inserting and removing electrolyte, and including sleeves slidably carried on said tube for closing said openings.

References Cited in the file of this patent
UNITED STATES PATENTS

| | | |
|---|---|---|
| 1,779,232 | Handforth | Oct. 21, 1930 |
| 2,684,938 | Mantzell | July 27, 1954 |
| 2,755,243 | Beckman et al. | July 17, 1956 |

OTHER REFERENCES

Germany, application Serial No. F 9115, printed September 15, 1955 (Kl. 421, G. 305) (2 pages spec., 1 sht. dwg.).

Mack et al., "Lab. Manual of Phy. Chem." (1934), page 250.